United States Patent
Schlaeger

(10) Patent No.: US 11,999,090 B2
(45) Date of Patent: Jun. 4, 2024

(54) METHOD AND DEVICE FOR CLASSIFY AT LEAST ONE TEMPERATURE CONTROL BRANCH

(71) Applicant: ENGEL AUSTRIA GmbH, Schwertberg (AT)

(72) Inventor: Mathias Schlaeger, Pregarten (AT)

(73) Assignee: ENGEL AUSTRIA GmbH, Schwertberg (AT)

( * ) Notice: Subject to any disclaimer, the term of this patent is extended or adjusted under 35 U.S.C. 154(b) by 0 days.

(21) Appl. No.: 17/960,469

(22) Filed: Oct. 5, 2022

(65) Prior Publication Data
US 2023/0104893 A1    Apr. 6, 2023

(30) Foreign Application Priority Data
Oct. 6, 2021    (AT) .............................. A 50799/2021

(51) Int. Cl.
*B29C 45/78*    (2006.01)

(52) U.S. Cl.
CPC .... *B29C 45/78* (2013.01); *B29C 2945/76046* (2013.01); *B29C 2945/76304* (2013.01);
(Continued)

(58) Field of Classification Search
CPC .......... B29C 45/78; B29C 2945/76046; B29C 2945/76304; B29C 2945/76545; B29C 2945/76782; B29C 2945/76946
(Continued)

(56) References Cited

U.S. PATENT DOCUMENTS

| | | | |
|---|---|---|---|
| 9,718,219 B2 | 8/2017 | Raschke et al. | |
| 2014/0217633 A1 | 8/2014 | Raschke et al. | |

FOREIGN PATENT DOCUMENTS

| | | |
|---|---|---|
| AT | 513872 | 8/2014 |
| DE | 10 2010 042 759 | 4/2012 |
| EP | 1 717 004 | 11/2006 |

OTHER PUBLICATIONS

Stricker, Michael, "Methods and parameters for the design and operation of temperature control systems in injection molding tools." Dissertation. Linz: Johannes Kepler University, 2015, with English abstract.
(Continued)

*Primary Examiner* — Jeffrey M Wollschlager
*Assistant Examiner* — Xue H Liu
(74) *Attorney, Agent, or Firm* — Wenderoth, Lind & Ponack, L.L.P.

(57) ABSTRACT

A method of classifying a temperature control branch of a molding tool includes producing molded parts in cycles by a portion of the molding tool by introducing heat into the molding tool, and/or cyclically activating a heating device, with introduction of heat into the molding tool, conveying temperature control medium through the temperature control branch of the molding tool to dissipate the introduced heat, measuring a temporal branch temperature profile of the temperature control medium in the temperature control branch over several production cycles, analyzing a curve behavior of the branch temperature profile and/or of a variable derived from the branch temperature profile, in particular of a branch heat flow, over several production cycles, and sorting the temperature control branch into one of at least two categories, according to greater and/or smaller influence on the heat budget of the portion of the molding tool, on the basis of the curve behavior.

19 Claims, 6 Drawing Sheets

(52) U.S. Cl.
CPC .............. *B29C 2945/76545* (2013.01); *B29C 2945/76782* (2013.01); *B29C 2945/76946* (2013.01)

(58) Field of Classification Search
USPC ........................................................ 264/40.1
See application file for complete search history.

(56) References Cited

OTHER PUBLICATIONS

Hassan, Hamdy, et al. "3D study of cooling system effect on the heat transfer during polymer injection molding." International Journal of Thermal Sciences, 2010, 49. Jg., Nr. 1, S. 161-169.
Zink, Béla, et al. "Enhanced injection molding simulation of advanced injection molds". Polymers, 2017, 9. Jg., Nr. 2, S.77.

Fig. 5

| Measurement on the temperature control circuit | Category | | |
|---|---|---|---|
| | 1 | 2 | 3 |
| Time offset of heat flow increase relative to the start of the production process/start of injection | Short | Medium | Long |
| Amplitude of the heat flow | High | Medium | Low |
| Recognition of cycle frequency in the heat flow after start of the production process/start of injection | Soon | Later | None |

| Resulting evaluation | 1 | 2 | 3 |
|---|---|---|---|
| Evaluation: position of temperature control channel relative to the cavity or influence on the component | Close or high | Medium or medium | Far away or low |
| Setpoint value of temperature difference (automatically ascertained) | Low | Medium | High |
| Resulting throughflow | High | Medium | Low |

METHOD AND DEVICE FOR CLASSIFY AT LEAST ONE TEMPERATURE CONTROL BRANCH

BACKGROUND OF THE INVENTION

The present invention relates to a method for classifying at least one temperature control branch of a molding tool according to an influence on a heat budget of at least one portion of a molding tool, a temperature control device for temperature control of a molding tool, as well as a computer program product for classifying at least one temperature control branch of the molding tool according to the influence on the heat budget of at least the portion of the molding tool.

The state of the art will be briefly outlined below with reference to injection molding machines and injection molding tools. Analogous statements also apply to general forming machines and molding tools.

Injection molding tools are temperature-controlled during the production process because the introduction of the molding compound generally causes high heat flows to be introduced into the molding tool, wherein, under some circumstances, separate heating can also be provided such that the injection molding tool has an appropriate temperature before or during the injection process.

Temperature control branches through which temperature control medium, for example water or oil, is conveyed are used for this temperature control. The heat from the injection molding tool is transferred to the temperature control medium and is thus dissipated (cooling). It can likewise be necessary to supply heat to the injection molding tool. Here, the heat is transferred from the temperature control medium to the injection molding tool (heating).

A wide variety of methods for the open-loop or closed-loop control of the temperature control media flows are known in the state of the art. Examples of these can be found in DE 102010042759 A1 or EP 1717004 A1. In practice, closed-loop control according to setpoint temperature differences (between inlet and outlet of the respective temperature control branch) or setpoint volume flows (for example in the form of flow rates, liters per minute) are used the most often.

The setting of these setpoint values is challenging in practice. Simulations of the process are performed ever more frequently—with or without modeling of the temperature control—and it would be entirely possible to set corresponding setpoint values with reference to the simulations and then to use them when production is actually started.

However, practical experience shows that little or even no use is made of this possibility in reality, for which there are various reasons (for example insufficiently realistic simulation, production and operation of the injection molding tool in different businesses, lack of information sharing, existing inventory of tools without simulation results or without design plan, unknown course of the temperature control branches within the injection molding tool, and the like).

Personnel responsible for adjusting the temperature control (and the installation as a whole) are therefore generally forced to perform the adjustment on the basis of experience, certain general guidelines and tests (trial and error).

For example, the general guidelines mentioned specify using smaller temperature differences in the case of precision injection molded parts (in order to guarantee a sufficiently homogeneous temperature distribution along the temperature control branch and in order to achieve a faster heat dissipation). Smaller temperature differences are furthermore to be used in the case of temperature control branches situated close to the cavity, because the temperature distribution thereof has a great influence on the tool surface temperature or molding cavity wall temperature, and because a greater heat dissipation is often also necessary here.

It is to be noted in this regard that the correct temperature control of the injection molding tool has a great and decisive influence on the adherence to manufacturing tolerances with regard to the dimensions, shrinkage and internal stresses of the injection molded parts—thus ultimately on the quality of the injection molded part to be produced. Of course, too high an energy consumption due to the introduction of much larger volume flows in the case of inherently less important (i.e. less relevant for the molded part properties or the quality of the molded part) temperature control branches than would be necessary for the quality requirement are likewise to be avoided. Through a high conveying capacity (volume flow or conveying pressure), this would lead to a high expenditure of energy in the case of the supply pump, in particular if this is controllable in a closed-loop manner. In the case of temperature control branches connected in parallel, for example if a temperature control medium distributor is used, an unnecessarily large volume flow in less important temperature control branches would reduce the usable volume flow of the other, more important (i.e. particularly relevant for molded part properties or the quality of the molded part), temperature control branches.

The supply pump can also be present in decentralized temperature control devices for a single machine, or centrally for several machines or consumers. If the supply pump supplies to several machines centrally, temperature control medium is "taken away" from other machines due to volume flows that are too large in less important temperature control branches.

Methods for identifying setpoint values for the temperature control can be found, in and of themselves, in the state of the art, wherein reference is made for example to AT 513872 A2. There is room for improvement here in that additional information regarding the geometry of the temperature control branches should be available for this.

SUMMARY OF THE INVENTION

The object of the invention is therefore to provide a method, a temperature control device, and a computer program product whereby the influence that a temperature control branch has on the heat budget of at least one portion of a molding tool can be determined with as little information as possible—preferably no information whatsoever.

With regard to the method, this object is achieved by performing the following method steps:
  producing, by proceeding in production cycles, molded parts by means of the at least one portion of the molding tool, with introduction of heat into the molding tool, and/or cyclically activating a heating device, with introduction of heat into the molding tool,
  conveying temperature control medium through the at least one temperature control branch of the molding tool in order to dissipate at least some of the introduced heat,
  measuring at least one temporal branch temperature profile of the temperature control medium in the at least one temperature control branch over several production cycles,
  analyzing a curve behavior of the at least one branch temperature profile and/or of a variable derived from the at least one branch temperature profile, in particular of at least one branch heat flow, over several production cycles, and sorting the at least one temperature control branch into one of at least two categories, according to greater and/or smaller influence on the heat budget of the at least one portion of the molding tool, on the basis of the oscillation behavior.

The analysis of the curve behavior can preferably be an analysis of the oscillation behavior and/or an analysis of the increase or decrease behavior.

The invention is based on the knowledge that the information as to which temperature control branches have a greater influence on the heat budget of the portion of the molding tool and which temperature control branches have a smaller influence on the heat budget of the molding tool can be extracted for example from the temperatures, the heat flows and/or the volume flows, which are for example often measured or calculated at the start of production in any case.

This can be effected through analysis of the oscillation behavior which, in the case of a process proceeding in production cycles, occurs over several production cycles.

In the second alternative, this is effected through analysis of the increase behavior which occurs for example at the start of production (or analogously of the decrease behavior).

One fundamental aspect of the invention is that, through analysis of a curve behavior (for example oscillation behavior and/or increase or decrease behavior), the temperature control branches can be categorized with regard to their influence on the heat budget of the at least one portion of the molding tool.

It is to be noted that the analysis of the increase behavior can also be performed in the case of forming processes proceeding in production cycles (in this regard, see the embodiment). The analysis of the oscillation behavior and the analysis of the increase or decrease behavior can therefore also be combined.

With regard to the temperature control device, a processing unit is configured:

to perform an analysis of a curve behavior, preferably of an increase or decrease behavior and/or of an oscillation behavior, of the at least one branch temperature profile and/or of a variable derived from the at least one branch temperature profile, in particular of at least one branch heat flow, preferably over several production cycles, and to sort the at least one temperature control branch into one of at least two categories, according to greater and/or smaller influence on the heat budget of at least one portion of the molding tool, on the basis of the curve behavior, preferably of the increase or decrease behavior and/or of the oscillation behavior.

With regard to the computer program product, the object is achieved by instructions which cause an executing computer:

to receive measured values in the form of at least one temporal branch temperature profile of a temperature control medium conveyed through the at least one temperature control branch of the molding tool, wherein the measured values are preferably present over several production cycles, to perform an analysis of a curve behavior, preferably of an increase or decrease behavior and/or of an oscillation behavior, of the at least one branch temperature profile and/or of a variable derived from the at least one branch temperature profile, in particular of at least one branch heat flow, preferably over several production cycles, and to sort the at least one temperature control branch into one of at least two categories, according to greater and/or smaller influence on the heat budget of the at least one portion of the molding tool, on the basis of the curve behavior, preferably of the increase or decrease behavior and/or of the oscillation behavior.

The invention can be used in the case of molding tools with a single temperature control branch. However, embodiments wherein several temperature control branches are categorized on the basis of the differences in the increase or decrease behavior and/or oscillation behavior are particularly preferred.

In the following, the focus will sometimes be on temperature control branches in the plural. However, unless explicitly stated otherwise or implicitly indicated otherwise, embodiments with only one temperature control branch are also meant here. This applies analogously to the at least one branch temperature profile.

The analysis of the curve behavior, preferably of the oscillation behavior and/or of the increase or decrease behavior, can be carried out on the at least one branch temperature profile itself or on a variable derived therefrom. For example, a branch heat flow, which can be calculated if for example a respective branch volume flow is known, for example through measurement, is appropriate as derived variable.

Through the use of heat flows in the analysis of the oscillation behavior, distorting effects, such as for example due to fluctuating temperatures or volume flows in the inlet, can be eliminated.

Other variables which are derived from the at least one branch temperature profile and which can be used for the analysis of the curve behavior, in particular of the oscillation behavior and/or of the increase or decrease behavior, would be for example:

an accumulated heat quantity, temperature differences between the inlet and outlet of the at least one temperature control branch (in particular in the case of a constant, for example closed-loop-controlled volume flow), as already mentioned, the outlet temperature, if the inlet temperature is kept substantially constant, for example by closed-loop control, and a branch volume flow, for example if the temperature difference between the inlet and outlet of the at least one temperature control branch is controlled in a closed-loop manner (the branch volume flow is then a variable derived indirectly from the branch temperature profile) Finally, the variables that correlate with the heat flow which the at least one temperature control branch imparts can thus be used as derived variables.

As already mentioned, the invention is based on the knowledge that, through analysis of the curve behavior, preferably of the oscillation behavior or of the increase or decrease behavior, the temperature control branches can be categorized with regard to their influence on the heat budget of the molding tool.

Tools with temperature control closely following a contour may be mentioned as a specific form of injection molding tools. Here, the temperature control branches in the tool insert are placed only a few millimeters away from the molding cavity wall in order to be able to influence the quality of the molded parts in an even more targeted manner.

As has likewise already been mentioned, correct temperature control is essential for the quality of the molded part to be produced. Through the categorization according to the invention, it can thus also be discovered which temperature control branches have a greater or smaller influence on the quality of the molded part to be produced.

As a rule, temperature control branches with a relatively great influence on the heat budget of the molding tool/on the quality of the molded part are also spatially relatively close to at least one forming cavity of the molding tool (and are therefore important for the heat budget of the molding tool, in particular, if they furthermore also dissipate large heat flows).

On the one hand, the categorization according to the invention makes an improved temperature control of the molding tool possible where this is important for the quality of the molded part. On the other hand, regions which are less important (for example in the region of platens, near base or intermediate plates), or for which merely as stable as possible a temperature and heat dissipation is important (for example in the region of a hot runner system), can be adequately temperature-controlled but without excessive expenditure of energy. It is to be noted here that, for example in the region of platens, a temperature control often cannot be omitted entirely, for instance owing to unfavorable thermal expansion to be avoided or owing to the heat losses to be avoided in the case of an unfavorable ambient temperature (difference between tool temperature and ambient temperature).

In particularly preferred embodiments of the invention, the oscillation behavior and/or the increase behavior of the branch temperature profiles is examined. In principle, however, the decrease behavior of the branch temperature profiles can also be used, by ending the production of the molded parts or the feed of the molding compound but continuing the conveying of temperature control medium and measurement of the branch temperature profiles. The branch temperature profiles will then exhibit temperatures which fall at different rates, which likewise enable the conclusions according to the invention regarding the influence of the respective temperature control branch on the heat budget of the at least one portion of the molding tool. The branch temperature of temperature control branches close to the cavity would, for example, decrease faster than the branch temperature of temperature control branches which are arranged far away from the cavity. The closer to the cavity the temperature control branch is arranged, the sooner the oscillation will no longer be detected, because molding compound is no longer being injected.

Within the framework of the invention, instead of the feed of molding compound, a heating device can also be used to introduce heat into the molding tool. This is preferably a heating device which is used in any case during the operation of the molding tool, such as for example a heating device for the temperature control of a hot runner system.

In preferred embodiments, the at least one portion of the molding tool can be the entire molding tool. However, embodiments wherein only a part of the molding tool is made the subject-matter of the invention are also conceivable.

For example, it would be possible to use only a hot runner system as at least one portion of the molding tool. Here, the hot runner system could be filled with molding compound and, from the increase behavior of the branch temperature profiles (temporal behavior and heat flow in the temperature control branch), it could be determined what influence the individual temperature control branches have on the heat budget of this portion. In many cases, in the temperature control of hot runner systems, it is necessary that as stable as possible an operation be achieved. Of course, information regarding which temperature control branches have a greater influence on the heat budget of the hot runner system is also advantageous here.

For example, individual heating zones of the hot runner system can thus be activated (irrespective of whether or not they are filled with molding compound; in a non-production situation, it is then clear where the heat originates from) and the increase behavior of the individual temperature control branches can be observed. According to the invention it can then be determined what influence the individual temperature control branches have on the heat budget of this portion of the hot runner system. This applies analogously to the deactivation of the heating zones. Temperature control branches with a great dissipated heat flow are situated spatially closer to the hot runner or in a location with higher heating power.

A further example of the at least one portion would be molding tools which have several mold cavities (also called molding cavities), with the result that several molded parts can be produced in one production cycle. The invention can here preferably be used such that molded parts are produced in all mold cavities, in order to examine the influence of the temperature control branches on the overall heat budget in the molding tool.

Alternatively, within the framework of the invention, only a single mold cavity or a group of mold cavities could be operated in order to examine the influence of the temperature control branches on the heat budget of the portion of the molding tool that includes this single cavity or group of cavities. An assignment of at least one temperature control branch to a single cavity or group of cavities would thus be possible.

All temperature control branches of a molding tool can preferably be used according to the invention (conveying of temperature control medium, measurement of the branch temperature profiles, analysis of the oscillation behavior and/or of the increase or decrease behavior, identification of the differences, sorting into at least two categories). However, a use in the case of a subset (with at least two temperature control branches) is also conceivable in principle, for example if, in the case of individual temperature control branches, it is already known that they are or are not close to the cavity (in general: in the vicinity of the at least one portion of the molding tool).

In molding tools, temperature control branches can be interconnected both in parallel and in series (in the fluidic sense), and mixed forms are of course also conceivable (for example parallel connection of temperature control branches connected in series).

The conveying of the temperature control medium can preferably be commenced before the start of the production of the molded parts and/or before the feed of the molding compound. In principle, however, it would also be conceivable to commence it at the same time as or shortly after the start of the production of the molded parts and/or the feed of the molding compound.

The conveying of the temperature control medium can preferably be commenced before the activation of hot runner systems. In principle, however, it would also be conceivable to commence it at the same time as or shortly after the activation of hot runner systems.

Water and/or oil can preferably be used as temperature control medium. The temperature control medium used can in practice be provided with various additives in order to adhere to a required water quality.

Within the framework of the analysis of the increase or decrease behavior, the feed of the molding compound can be effected once, continuously or cyclically.

Protection is furthermore sought for a forming machine with a temperature control device according to the invention.

By forming machines is meant here injection molding machines, injection presses, presses and the like.

It is noteworthy that the temperature control device can be integrated into the forming machine or can be formed separately (the temperature control device is then often called an add-on device or temperature control unit). Furthermore, embodiments are perfectly conceivable wherein the functions of the temperature control device according to the invention are fulfilled by several separate devices, for example by:
- a temperature control unit which provides a pump and a central inlet, and/or
- a separate temperature control medium distributor, in which, for example, the temperature sensors and/or volume flow sensors are provided, and/or
- a separate processing unit.

Independently of this, the processing unit can be formed integral with a central machine controller of the forming machine or can be formed as a processing unit separate therefrom, for example as a ("cloud") server which is directly connected to the machine controller or the sensors via a long-distance data transmission connection.

The temperature control device can particularly preferably include an open-loop or closed-loop control unit for the open-loop or closed-loop control of a temperature control media flow conveyed through the temperature control branches, using different setpoint values, in particular setpoint temperature differences and/or setpoint volume flows, for the temperature control branches.

For this purpose, the temperature control device can particularly preferably include actuators which are connected, for transmission of signals, to the open-loop or closed-loop control unit and which are formed to influence the temperature control media flows in the temperature control branches.

The actuators can for example be volume flow control valves, proportional valves and/or throttles, which can be directly actuated for adjustment to a desired degree of throttle opening. A further possibility for closed-loop volume flow control is a pump system (consisting of motor and pump) with closed-loop rotational speed control (or else closed-loop conveying rate control). Such arrangements can also be regarded as actuators within the meaning of the invention.

Of course, the open-loop or closed-loop control unit can also be connected, for transmission of signals, to the temperature sensors. The measured values from the temperature sensors can thereby be used as feedback for a closed-loop control, in particular a closed-loop temperature difference control. This applies analogously to volume flow sensors and closed-loop volume flow control arrangements which may be present.

The open-loop or closed-loop control unit can particularly preferably be formed such that setpoint values can be chosen individually for each temperature control branch or groups of branches.

The open-loop or closed-loop control unit can be formed integral with the processing unit and/or with a central machine controller of a forming machine.

It is furthermore to be noted that the temperature sensors according to the invention need not (but may nonetheless) be arranged within the molding tool. In many cases, outlet temperatures are simply measured where the temperature control branches open into the temperature control device again.

Inlet temperatures can be measured in each individual temperature control branch or in a distributor or in the immediate surroundings of a distributor if several, in particular parallel, temperature control branches are provided.

The invention can be used both with recorded measurement data of the at least one branch temperature profile or with data in real time or with a sampling time that is practicable for thermal measurements, for example in the region of one second.

With regard to the computer program product, the executing computer can be the processing unit of the temperature control device according to the invention.

The computer program product can preferably additionally include commands which cause an executing computer:
- to actuate the forming machine to start and/or stop the production of molded parts in production cycles, and/or
- to actuate a hot runner system and/or individual heating zones of a hot runner system for activation and/or deactivation, and/or
- to actuate the temperature control device and/or the forming machine to convey temperature control medium through the at least one temperature control branch, and/or
- to perform open-loop or closed-loop control of the temperature control media flow conveyed through the at least one temperature control branch, and to correspondingly actuate the actuators corresponding to the open-loop or closed-loop control.

Protection is finally also sought for a computer-readable storage medium on which a computer program product according to the invention is stored.

The fact that a temperature control media flow conveyed through the at least one temperature control branch is controlled in an open-loop or closed-loop manner does not necessarily mean that a volume flow is used as a manipulated variable for the open-loop or closed-loop control. Open-loop or closed-loop control with a temperature difference as manipulated variable can preferably be provided, wherein subordinate open-loop or closed-loop control of the volume flows can be provided.

The at least one portion of the molding tool can preferably be a portion that is filled with a molding compound for the purposes of the forming process (together with the surroundings thereof). In principle, however, other portions of the molding tool which experience a significant introduction of heat could also be examined with the invention.

The measurement of the at least one branch temperature profile can preferably be effected in the outlet of the at least one temperature control branch, thus after the forming tool has been passed through.

In addition, the inlet temperature and/or the branch volume flow can also be measured in order to be able, if necessary, to calculate the branch heat flow which is imparted by the at least one temperature control branch.

It may be pointed out that, in principle, mass flows could also be used instead of the volume flows mentioned in the present document.

Within the framework of the present invention, by temperature control can be meant cooling and/or heating.

Measures described in conjunction with the state of the art can also be used within the framework of the invention.

The methods according to the invention can also be applied to a simulated molding tool. This makes a comparison possible between the temperature control circuits of the simulated molding tool and the temperature control circuits of the actual molding tool with reference to the ascertained curve behavior, preferably the oscillation behavior, increase behavior and/or decrease behavior. The individual temperature control circuits of the simulated molding tool can thereby be assigned to the individual temperature control circuits of the actual molding tool. On the one hand, it can thereby be ascertained whether the temperature control branches of the actual molding tool have been connected as planned. On the other hand, without changing the connections, an adaptation of setpoint values can be performed, for example for closed-loop temperature difference control or closed-loop volume flow control.

It has already been mentioned that several temperature control branches can be used, and that the differences between the temperature control branches in the curve behavior, preferably in the oscillation behavior and/or in the increase or decrease behavior, can be used for the classification of the temperature control branches.

Within the framework of the analysis of the oscillation behavior of the at least one branch temperature profile, an amplitude, a frequency and/or a period of the at least one branch temperature profile or of the derived variable, such as for example of a heat flow, can preferably be determined and used for the identification of the differences in the oscillation behavior.

In particular, for example with the aid of a Fourier transformation, it can be examined to what degree the cycle time (or, equivalently, the cycle frequency) of the production cycles is reflected in the branch temperature profiles. In principle, of course, other (integral) transformations can also be used for this purpose.

In principle, it would also be conceivable, within the framework of the analysis of the oscillation behavior, to perform analyses of the increase and/or decrease behavior in every cycle.

Within the framework of the analysis of the increase behavior, a time of the first increase of the at least one branch temperature profile lying above a threshold value can be determined, and optionally used for the identification of the differences in the increase behavior. The "time" can for example simply be the number of the production cycle, if the production cycles are numbered consecutively in an obvious manner starting from the start of production (incremented for example using an injection signal for the screw advancing movement or other signals which describe the injection of the molding compound). Of course, the time of the first increase can also be determined with a higher time resolution.

It would likewise be possible, within the framework of the analysis of the decrease behavior, to determine a time delay between a stoppage of production (no further feed of the molding compound) and the start of the decrease of the at least one branch temperature profile or of the variable derived therefrom.

Alternatively or in addition, in the analysis of the increase or decrease behavior, a gradient of the increase or decrease can also be ascertained.

According to the invention, the temperature control branches can be divided into at least two categories, i.e., for example, temperature control branches:

of which the Fourier transformations of the corresponding branch temperature profiles or of the corresponding derived variables have a greater maximum in the cycle frequency domain than other temperature control branches, and/or of which the oscillation amplitude in the corresponding branch temperature profiles or of the corresponding derived variables, preferably in the cycle frequency domain, is higher than the oscillation amplitude of other temperature control branches, and/or of which the time of the first increase of the corresponding branch temperature profiles is earlier than that of other temperature control branches, and/or of which the gradient of the corresponding branch temperature profiles is greater in magnitude, and/or the dissipated heat flow is larger than that of other temperature control branches, and/or of which the accumulated heat quantity is larger than that of other temperature control branches can be sorted into a category of greater influence on the heat budget of the molding tool (and thus of greater influence on the quality of the molded part to be produced), and the remaining temperature control branches can be sorted into a category of smaller influence.

Within the framework of the analysis of the increase or decrease behavior, however, a figure for the strength of the increase or decrease (for example in the form of an exponential coefficient) can also be ascertained for example.

Particularly preferably, at least one setpoint value for the open-loop or closed-loop control of temperature control media flow conveyed through the at least one temperature control branch is set on the basis of the categories of the at least one temperature control branch.

Of course, these setpoint values can be chosen such that larger temperature control media flows are achieved in the case of temperature control branches with greater influence on the heat budget of the at least one portion of the molding tool (and thereby on the quality of the molded parts produced) (or formulated the other way round: such that smaller temperature control media flows are achieved in the case of temperature control branches with smaller influence on the heat budget of the at least one portion of the molding tool (and thereby on the quality of the molded parts produced).

For this purpose, setpoint values can be chosen individually for each branch or groups of branches.

By the setting of setpoint values for open-loop or closed-loop control is meant here both the correction of already existing setpoint values and the original setting of same.

At least one setpoint temperature difference between an inlet temperature and an outlet temperature of the at least one temperature control branch can preferably be used here as at least one setpoint value, wherein the setpoint temperature differences for temperature control branches with greater influence on the heat budget of the at least one portion of the molding tool are preferably set smaller in magnitude than the setpoint temperature differences for temperature control branches with smaller influence on the heat budget of the at least one portion of the molding tool.

Setpoint temperature differences have the advantage that volume flows through the individual temperature control branches do not need to be specified in detail. Instead, they result for example within the framework of a subordinate closed-loop control of the volume flows. At the same time, by maintaining the temperature difference, it is ensured that adequate heat flows are dissipated from the molding tool and a sufficiently homogeneous temperature distribution can be guaranteed over the length of the temperature control branch.

It is also to be noted that the inlet temperature is in many cases measured in a central inlet (also called inflow), with the result that not every temperature control branch thus requires a separate temperature sensor for the inlet temperature. In fact, in particular in larger plants, it is simply possible to assume a known constant inlet temperature which is provided by a provision device for temperature control medium (main example: water) for a production cell or even for the entire plant. However, separate inflow temperatures can also be specified for each temperature control branch (temperature control with individual temperature control units).

In principle, however, it is alternatively or additionally also conceivable that setpoint volume flows are used as setpoint values. The setpoint volume flows for temperature control branches with greater influence on the heat budget of the at least one portion of the molding tool are chosen to be larger, relative to a maximum achievable volume flow (of the respective temperature control branch), than in the case of temperature control branches with smaller influence on the heat budget of the at least one portion of the molding tool.

The maximum achievable volume flow for each temperature control branch is generally dependent here on the available pressure in the supply line and on the geometry of the temperature control branch. These data can be taken into consideration in the setting and/or calculation of the setpoint volume flows.

In particularly simple embodiments of the invention, actuators, such as for example adjustable throttles, can be or remain fully opened (for example 100% degree of throttle opening) for temperature control branches with greater influence on the heat budget of the at least one portion of the molding tool, and can be closed up to a certain percentage (for example 80% or 50% degree of throttle opening) for those with smaller influence on the heat budget of the at least one portion of the molding tool. This can optionally even be effected manually at the suggestion of the at least one processing unit. However, embodiments wherein the actuators are actuated by the at least one processing unit can be preferred.

Actuators for open-loop-controlled or closed-loop-controlled influencing of temperature control media flow conveyed through the at least one temperature control branch can be made equal, in particular can be fully opened, at the start of the method. By making the actuators equal, the branch temperature profiles are particularly meaningful with regard to their influence on the heat budget of the at least one portion of the molding tool, because then no systematic deviations are introduced due to differently throttled temperature control branches.

By "the actuators are made equal "at the start" of the method" can be meant that the making equal is performed before the temperature control medium is conveyed through the temperature control branches. Of course, it is alternatively conceivable in principle that the actuators are made equal at the same time as or shortly after the start of the conveying of the temperature control medium.

Several temperature control branches can be used, and the actuators for open-loop-controlled or closed-loop-controlled influencing of temperature control media flows conveyed through the temperature control branches can be adjusted at the start of the method such that the temperature control media flows through the temperature control branches are made equal.

In other words, the volume flows of the individual temperature control branches can be adjusted by closed-loop control to the same setpoint value and thus, for example, kept constant. Since the heat flow in the temperature control medium is ascertained from, among other factors (constants), the product of volume flow and temperature difference, the consideration of the behavior of the outlet temperature of a temperature control branch can, in the case of constant inlet temperature, be sufficient to perform the described analyses.

A possibly provided open-loop or closed-loop control of the temperature control media flows through the temperature control branches can be suspended for the duration of the method according to the invention. (For the tests presented in the description of the figures, to record the temperature profiles, the closed-loop volume flow control was kept active in order to have a constant volume flow.) The at least one branch temperature profile can be used in the form of a temporal profile of at least one temperature difference between an inlet temperature and an outlet temperature of the at least one temperature control branch. In other words, for the temperature control branch or the temperature control branches, profiles of the outlet temperatures and of the inlet temperature are measured, and the difference thereof is used as a branch temperature profile for the respective temperature control branch. Alternatively, it can in many cases be assumed that the inlet temperature from a common inlet is equal (and substantially constant) for all temperature control branches, and simply an outlet temperature profile is used as branch temperature profile of the respective temperature control branch.

The at least one temperature control branch can for example also be sorted into at least three (or more) categories, which at least three categories include at least one category of great influence on the heat budget of the portion of the molding tool, at least one category of medium influence on the heat budget of the portion of the molding tool and at least one category of small influence on the heat budget of the portion of the molding tool. The more, and thus more finely granular, categories are used, the more individually the setpoint values can be set for the open-loop or closed-loop control of the temperature control branches.

At least one of the method steps of the method according to the invention (in both variants) can be performed automatically by a processing unit.

For operators of the forming machine, the problem on which the invention is based can thereby be not only solved but eliminated entirely, for example because the temperature control device provides the setpoint values for the temperature control entirely by itself.

Here, the above-mentioned techniques for analyzing the oscillation behavior and/or the increase or decrease behavior can be used, wherein data evaluation methods known per se, for example for determining Fourier transformations, maximum values, time offsets (time delays) until an increase or decrease, or gradients of an increase or decrease, can be used.

The temperature control branches can also be called temperature control circuits or circuits for short, in particular when they are connected in parallel. The production cycles can also be called cycles for short. The duration of a production cycle can be called cycle time for short, and the frequency corresponding to this cycle time can be called cycle frequency.

The analysis according to the invention of the curve behavior, preferably of the oscillation behavior and/or of the increase or decrease behavior (and optionally the corresponding categorization) can also be used for the monitoring of the installation.

If the curve behavior, preferably the oscillation behavior and/or the increase or decrease behavior, changes quickly for example, it can be concluded that there are non-functioning circuits (for example blockage) or faulty forming tools or hot runner systems. For example, on this basis, warning messages can be output and/or a stoppage of production can be initiated and/or a heating arrangement can be deactivated.

BRIEF DESCRIPTION OF THE DRAWINGS

Further details and advantages of the invention follow from the figures and from the associated description of the figures, in which:

FIG. 5 is a diagram to explain the sorting according to the invention of the temperature control branches into categories.

DETAILED DESCRIPTION OF THE DRAWINGS

Figure 1:
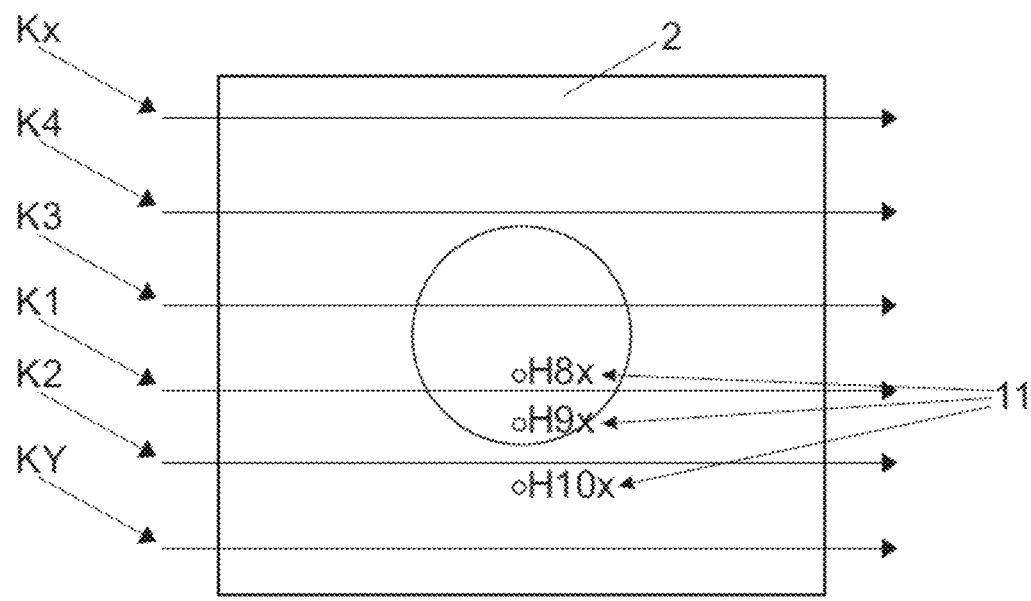
FIG. 1 is a schematic representation of a molding tool.

FIG. 1 shows a schematic representation of a molding tool 2 (here the nozzle side of an injection molding tool) in which the method according to the invention has been performed. Temperature control branches (temperature control circuits) K1 to K4 and KX and KY lead through the molding tool 2. In this design, the temperature control branches K1 to K4 and KX and KY are connected in parallel in the fluidic sense (analogously to FIG. 8).

However, for the sake of simplicity, only the temperature control branches K1 to K4 have been used for the method according to the invention in order to reduce the amount of data.

It is to be noted that the temperature control branches K1 to K4 are not represented according to their actual spatial configuration. However, the mold cavity 13, not represented in FIG. 1, is situated approximately centrally in the molding tool 2 (indicated by the gray circle in the center).

To illustrate the functioning of the invention, temperature probes 11 (here: thermocouples) have also been installed in the molding tool 2 itself in order to demonstrate the good correlation between the actual heat situation in the molding tool 2 and the data collected according to the invention. The temperature probes 11 are more specifically numbered consecutively as H8x, H9x and H10x. Of course, these temperature probes 11 installed in the molding tool 2 are not necessarily required in practice when the method according to the invention is actually performed.

For the sake of completeness, a simplified heat balance in the injection molding tool may be expressed as follows:

$$\dot{Q}_{TM} - \dot{Q}_U + \dot{Q}_F + \dot{Q}_H = 0$$

$\dot{Q}_{TM}$ heat flow which the temperature control medium supplies or discharges (heating or cooling by means of the temperature control medium)

$\dot{Q}_U$ heat flow to the surroundings $\dot{Q}_F$ heat flow of the molded part $\dot{Q}_H$ additional heat flow, for example through hot runners Simplified heat flow of the molded part:

$$\dot{Q}_F = \Delta h \cdot \frac{m_F}{t_z}$$

$\Delta h$ enthalpy difference $m_F$ mass of the molded part $t_z$ cycle time

Heat flow of the temperature control medium (in the case of cooling $\dot{Q}_{TM}$ is negative):

$$\dot{Q}_{TM} = -\dot{Q}_F - \dot{Q}_H + \dot{Q}_U$$

The magnitude of the branch heat flows is represented in each case in the figures.

$$\dot{Q}_{TM} = \dot{m}_{TM} \cdot c_{TM} \cdot \Delta T = \dot{V}_{TM} \cdot \rho_{TM} \cdot c_{TM} \cdot \Delta T$$

$$\Delta T = T_{in} - T_{out}$$

$\dot{V}_{TM}$ volume flow of the temperature control medium $\rho_{TM}$ density of the temperature control medium (approximately constant in the case of a substantially constant temperature)

$c_{TM}$ specific heat capacity of the temperature control medium (approximately constant in the case of a substantially constant temperature)

Figure 2:
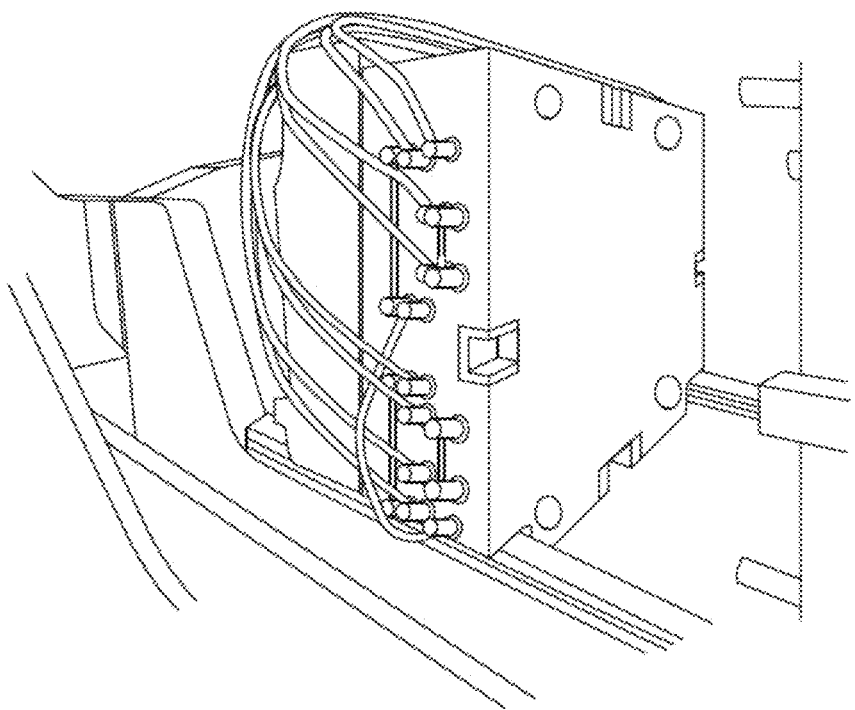
FIG. 2 is a traced photographic representation of a molding tool (image source: Wikipedia), FIG. 3 are examples of branch temperature profiles for performing the method according to the invention.

$\Delta T$ difference between inlet and outlet temperature of a temperature control branch The information as to which temperature control branch K1 to K4 in an actual molding tool 2 is arranged how geometrically, in particular how closely the individual temperature control branches K1 to K4 lead past the mold cavity 13, is often not available in practice. In fact, for a person responsible for setting up the forming process, the situation on the molding tool 2 appears simply as in the photograph from FIG. 2.

As depicted in the photograph, although hoses can be connected for the supply and discharge of temperature control medium (water in this embodiment), it is not clear how these temperature control branches K1 to K4 lead through the molding tool 2.

At this point the method according to the invention can be used. Firstly, in the embodiment presented here, the production of the molded parts is started. Since this embodiment is an injection molding process, the production proceeds in production cycles, wherein the molding tool 2 is closed and subjected to a closing force, and a molding compound 12 (here: plastic) is then injected into the mold cavity 13.

Within the framework of the method according to the invention, the production cycles can be test cycles or start-up cycles in order to check and/or adapt the correct adjustment of the forming machine or to create defined thermal conditions. In many cases, such test cycles have to be performed during the setup of the molding tool 2 in any case.

Conveying of temperature control medium through the temperature control branches K1 to K4 is thus commenced before the start of the production cycles. Branch temperature profiles RLT01 to RLT04 of the temperature control branches K1 to K4 are measured by means of temperature sensors 6, and in the embodiment presented here also with the temperature probes 11 arranged in the molding tool 2. Analogously, temperature profiles H8x and H9x are measured with the temperature probes 11. These are represented in FIG. 3.

Figure 3:
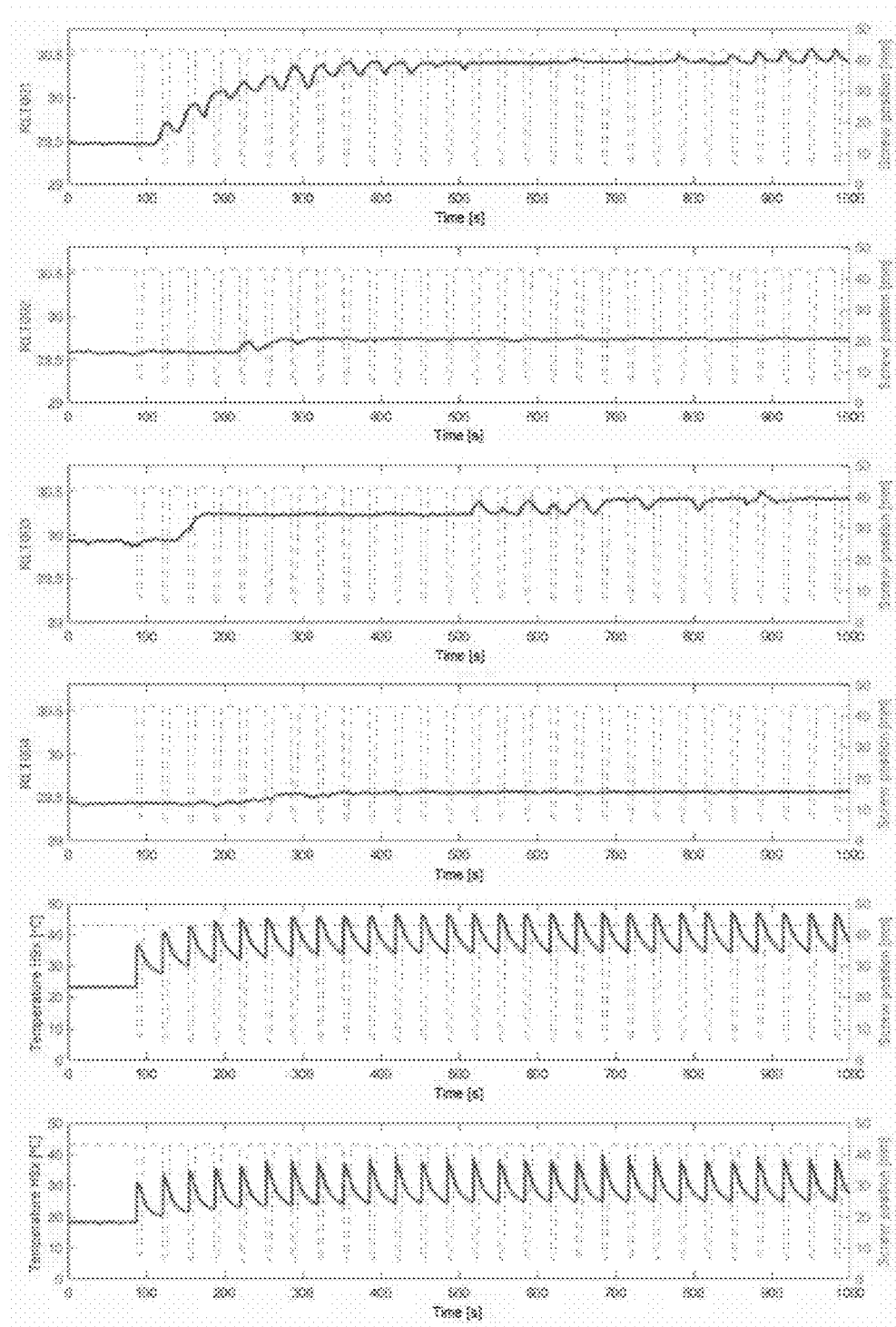

The individual curves in FIG. 3 are plotted along the time axis. In the present embodiment, the branch temperature profiles RLT01 to RLT04 are the direct measured values from temperature sensors 6, which have been measured in each case in the outlet of the temperature control branches K1 to K4, because the temperature control branches K1 to K4 are fed from the same central inlet, with the result that it can be assumed that the inlet temperatures for the temperature control branches K1 to K4 are in each case identical. For the test, the volume flows of the temperature control branches K1 to K4 have been adjusted by closed-loop control to the same value. The outlet temperature in the respective circuit thus remains as the only factor that is more alterable over time.

Of course, a preprocessing of the measured signals is possible, for example by filtering.

Here, the following obvious assignment applies: branch temperature profile RLT01 to temperature control branch K1, branch temperature profile RLT02 to temperature control branch K2, branch temperature profile RLT03 to temperature control branch K3, and branch temperature profile RLT04 to temperature control branch K4.

The vertical dashed lines in the individual diagrams from FIG. 3 show movements of the plasticizing screw (screw position) of the injection molding machine used, i.e. an injection operation. In each case a pair of vertical lines therefore indicates approximately a new forming cycle, and the duration between adjacent pairs corresponds approximately to the cycle time.

It can be seen that the measured values react to the heat introduced into the molding tool 2 as a result of the start of production at different rates and to different degrees.

Analysis of the increase behavior: in detail, it can be seen that the branch temperature profile RLT01 reacts most quickly to the introduction of heat, the branch temperature profile RLT03 reacts next, and the branch temperature profiles RLT02 and RLT04 react the slowest (and on the whole relatively weakly).

The time of the first increase (here the second cycle in the case of RLT01 and third cycle in the case of RLT03) in the form of a time interval since the start of production (injection operations) can be determined automatically using data evaluation methods known per se.

The greatest change in the branch temperature in terms of magnitude occurs in the case of temperature control branch K1, followed by K3. Smaller increases occur in the temperature control branches K2 and K4 (the branch temperature profiles RLT01 to RLT04 from FIG. 3 are scaled equally).

Furthermore it can be seen that branch temperature profile RLT01 and, to a somewhat lesser degree, branch temperature profile RLT03 correlate with the oscillations which occur in the measured values H8x and H9x from the temperature probes 11 arranged in the molding tool 2. This shows that the influence that an individual temperature control branch K1 to K4 has on the heat budget of the molding tool 2 is clearly reflected in these measured values, which is not necessarily to be expected owing to the complex heat situation in the molding tool 2.

Analysis of the oscillation behavior: this correlation of the oscillations in the branch temperature profiles RLT01 to RLT04 can be analyzed relatively easily with the aid of a Fourier transformation.

Figure 4:
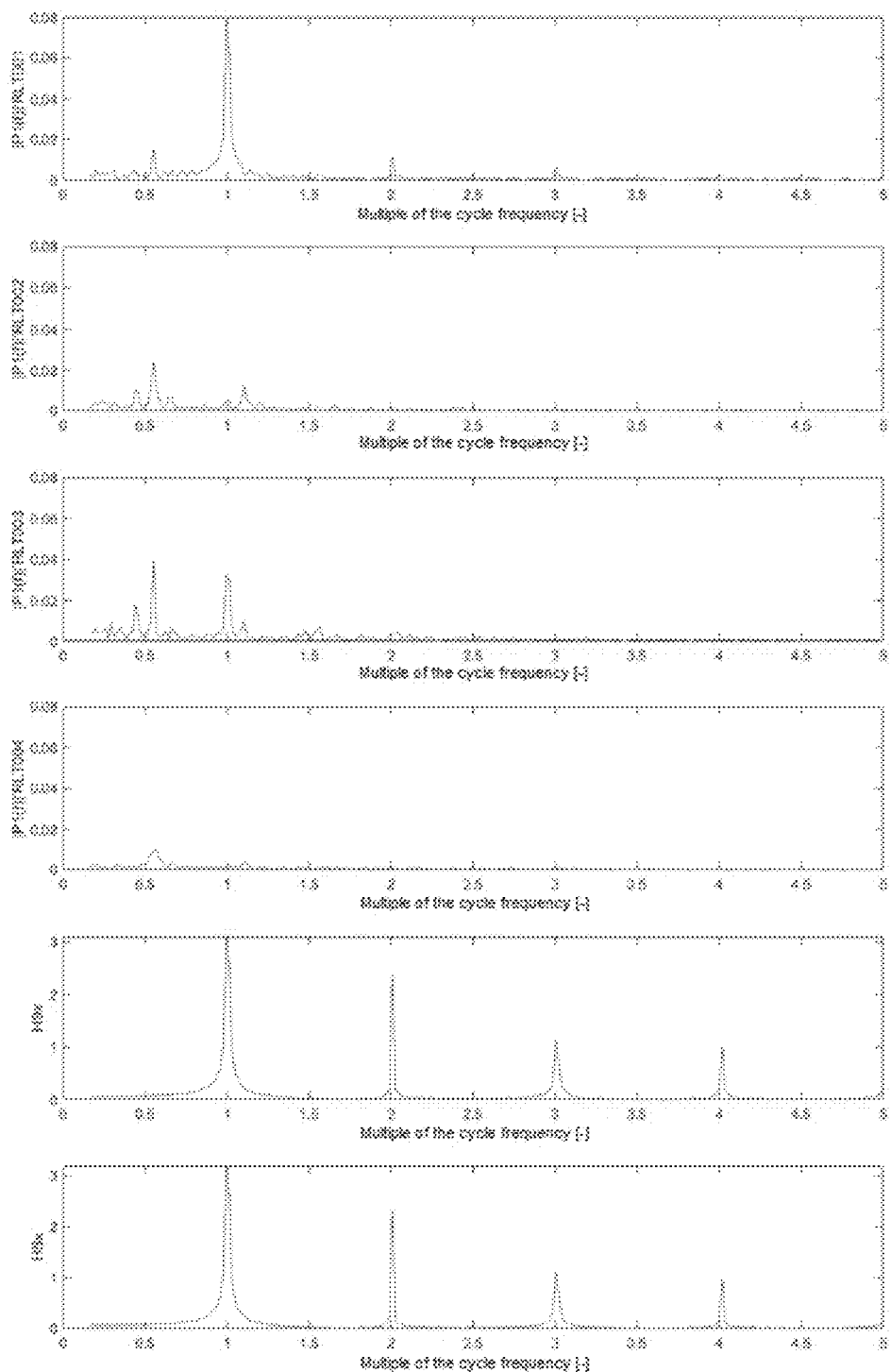
FIG. 4 shows a Fourier transformation of the branch temperature profiles.

The Fourier transformations of the measurement profiles from FIG. 3 are represented in FIG. 4. Here, the X axis has been scaled in units of multiples of the cycle frequency (thus the reciprocal values of the multiples of the cycle times).

It can be clearly seen that, in FIG. 4, in the case of the Fourier transforms of the branch temperature profiles RLT01 and RLT03, maxima result at one times the cycle frequency, which are furthermore a good match with the corresponding maxima in the case of the measured values H8x and H9x from the temperature probes 11 in the tool.

Amplitudes of the oscillations in the branch temperature profiles RLT01 to RLT04 can also be ascertained with reference to the measured values from FIG. 3 and compared with one another. Again, it emerges that the amplitudes in the region of one times the cycle frequency prove to be most pronounced in the case of the branch temperature profile RLT01, second most pronounced in the case of the branch temperature profile RLT03, and weakest in the case of the branch temperature profiles RLT02 and RLT04.

The maxima of the branch temperature profiles RLT01 to RLT04 and the maxima of the Fourier transforms of the branch temperature profiles RLT01 to RLT04 can also be determined automatically using data evaluation methods known per se.

It is to be noted that the branch temperature profiles RLT01 to RLT04 each have maxima of different magnitudes at slightly over one half of the cycle time. These can be fluctuations which are present in the temperature of the supplied temperature control medium. In principle, these could be eliminated through measurement of the inflow temperature and subtraction of the branch temperature profiles RLT01 to RLT04.

FIG. 5 illustrates an embodiment of the logic in the sorting of the temperature control branches K1 to K4 into categories (which have been numbered consecutively 1, 2 and 3) with regard to the influence on the molded part (the quality of the molded part).

Following the above-described analysis of the increase behavior (time offset, increase, heat flow), the amplitude of the oscillation behavior and the frequency of the oscillation behavior, the temperature control circuits K1 to K4 can be sorted into the three categories (evaluation of the position of the temperature control runner relative to the cavity/influence on the molded part).

For example, in the present embodiment, the temperature control branch K1 associated with the branch temperature profile RLT01 would, according to all three criteria (increase behavior, amplitude, frequency), be to be sorted in each case into category 1 (fastest increase, highest amplitude, highest maximum of the Fourier transformation at one times the cycle time).

This is followed by the temperature control branch K3 associated with the branch temperature profile RLT03, in category 2, and the temperature control branches K2 and K4 respectively associated with the branch temperature profiles RLT02 and RLT04, in category 3.

Accordingly, the temperature control branches K1 to K4 are divided into the three categories:
Category 1: temperature control branch K1
Category 2: temperature control branch K3
Category 3: temperature control branches K2 and K4

Instead of a relative categorization (greatest influence: category 1, smallest influence: category 3) of the temperature control branches K1 to K4, absolute criteria could also be used for the sorting of the temperature control branches K1 to K4 into the categories.

One example would be:
- to sort those temperature control branches K1 to K4 of which the times of the first increase lie fewer than X1 cycles after the start of production into category 1,
- to sort those temperature control branches K1 to K4 of which the times of the first increase lie more than X1 but fewer than X2 cycles after the start of production into category 2, and
- to sort those temperature control branches K1 to K4 of which the times of the first increase lie more than X2 cycles after the start of production into category 3, wherein X1<X2<X3. This could also be effected analogously for the amplitude or the correlation with the cycle frequency.

Examples of the limit values would be X1=3 and X2=6.

In summary, temperature control branches K1 to K4 that are critical (thus important for the quality of the molded part to be produced) are those which have to dissipate large heat flows and/or which are situated close to the cavity surface. The evaluation is effected with regard to:
- the size of the heat flows and/or through the amplitude of the heat flow in the temperature control branch K1 to K4 and/or the size of the change in the amplitude due to the start/end of molded part production/hot runner circuit,
- the proximity to the cavity surface, for example through the rate of change of the heat flow in a temperature control branch K1 to K4 (how quickly does the heat flow increase in which branch?) and the time offset relative to the first injection (the shorter the time, the closer), and
- the proximity to the cavity surface, for example through identification of one times the cycle frequency (the closer to the mold cavity 13 a temperature control branch K1 to K4 is situated, the earlier the cycle frequency is identifiable in the temperature control branch K1 to K4; the closer to the mold cavity 13 a temperature control branch K1 to K4 is situated, the more easily identifiable the cycle frequency is; in the latter case: fewer interference effects, reflections, . . . )

As mentioned, the categories can be defined on the one hand on the basis of predefined limit values for the differing variables discussed, whereby the invention can also be used with a single temperature control branch.

Embodiments in which a "most critical" temperature control branch is used as reference for category 1 and the other temperature control branches are defined using relative bounds (for example in the form of percentage values) can be particularly preferred.

The setpoint values, in this embodiment setpoint temperature differences, can also be specified corresponding to the categorization according to the invention of the temperature control branches K1 to K4, namely a small setpoint temperature difference for temperature control branch K1, a medium setpoint temperature difference for temperature control branch K3, and a larger setpoint temperature difference for the temperature control branches K2 and K4.

As desired, this will lead to a greater volume flow through the temperature control branch K1, a medium volume flow through temperature control branch K3 and a smaller volume flow through the temperature control branches K2 and K4 (relative to a maximum possible volume flow through the respective temperature control branch). The volume flow resulting in the case of a closed-loop-controlled temperature difference is also dependent on the heat flow introduced in the respective temperature control branch.

For example, the following setpoint temperature differences could be specified for the categories:

| Category 1 | 1° C. | or | 1° C. |
| Category 2 | 2° C. | | 3° C. |
| Category 3 | 3° C. | | 5° C. |

Of course, it would also be conceivable that operators specify the setpoint values on the basis of the sorting of the temperature control branches K1 to K4 into the categories.

Alternatively, setpoint volume flows for the individual temperature control branches K1 to K4 could also be determined directly.

Figure 6:
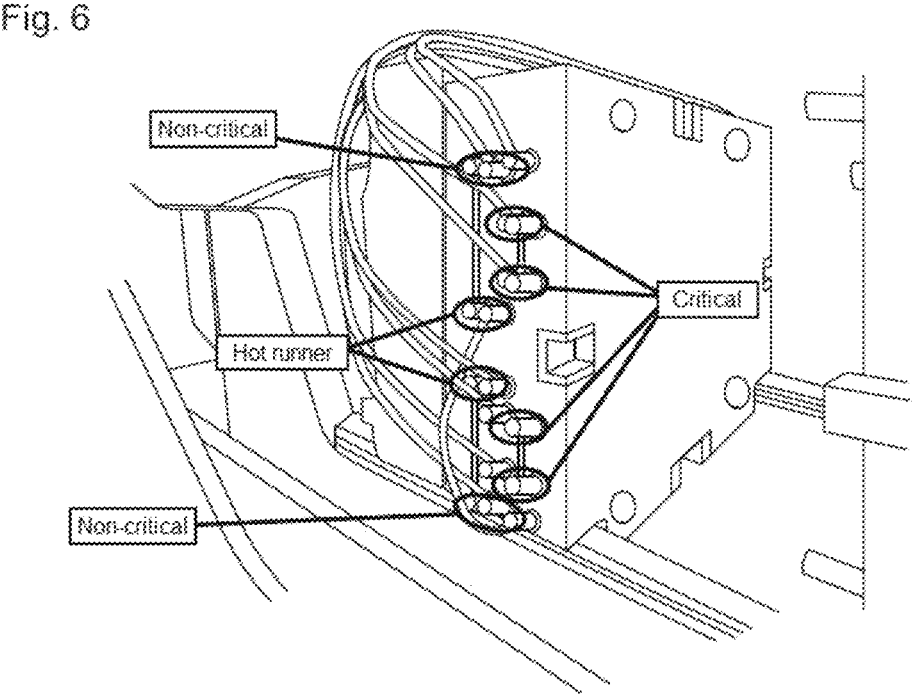
FIG. 6 is a representation of the molding tool from FIG. 2, wherein the drawing indicates which temperature control branches have what influence on the heat budget of the molding tool.
Figure 9:
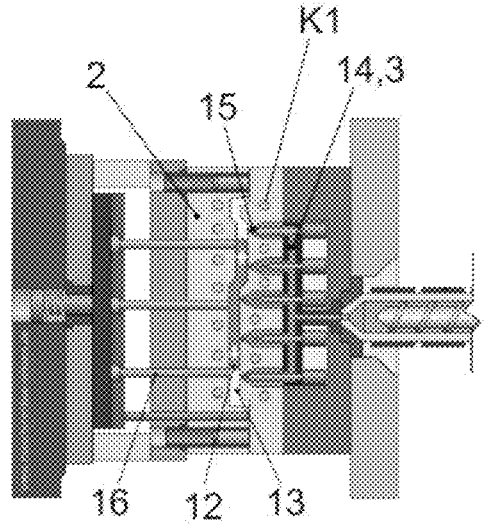
FIG. 9 is a schematic representation of a molding tool with a hot runner system (image source: Plastverarbeiter).

Even if setpoint values for the open-loop or closed-loop control of the temperature control media flows through the temperature control branches K1 to K4 are not specified directly, important information for operators results from the method according to the invention simply because the temperature control branches K1 to K4 that are critical for the quality of the molded parts to be produced are thereby known, which is illustrated in the photograph from FIG. 6 (the identification of temperature control branches K1 to K4 with greater influence on a portion 3 of the molding tool 2 with a hot runner system 14 is described in conjunction with FIG. 9). FIG. 6 could thus be regarded as a simple representation of the result of the invention.

If a fault occurs in a circuit that is critical or close to the cavity (category 1), it is clear to the operator, through the knowledge from applying the invention, that this fault can have a direct influence on the quality of their molded part.

Possible actions can be fault messages triggered by the control unit, or a production stoppage of the machine.

A non-critical circuit (category 3) can be dealt with differently in the event of a fault. For example, the control unit can only trigger a notification message but not perform an immediate stoppage of production.

If, for example, only manual valves are present for the adjustment of throttles for the individual temperature control branches K1 to K4, operators can meaningfully adjust these manual valves on the basis of the categorization mentioned (for example fully opened for temperature control branch K1, medium degree of opening for temperature control branch K3, and small degree of opening for the temperature control branches K2 and K4).

In any case, a better temperature control of the molding tool 2 with regard to the quality of the molded parts and an intelligent distribution of the temperature control medium, which is present to a limited extent, can be achieved.

Figure 7:
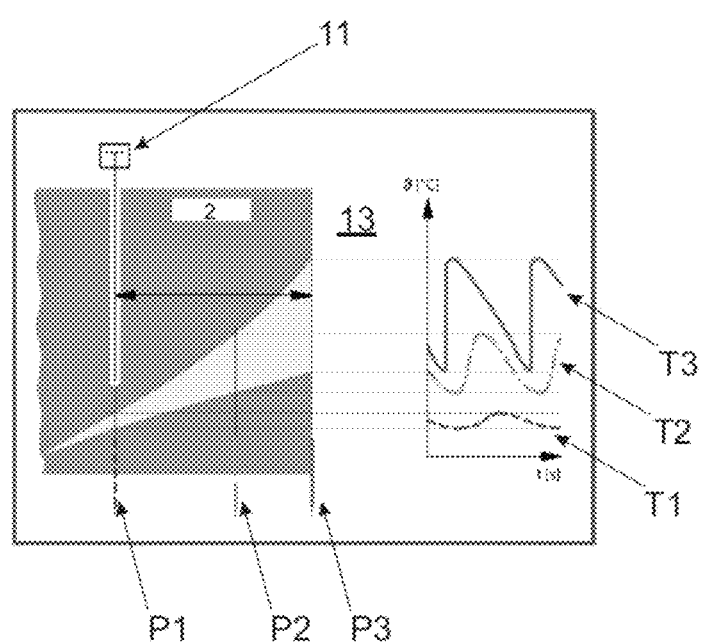
FIG. 7 is a diagram to illustrate the principle, utilized by the invention, of the propagation of thermal waves (image source: Plastverarbeiter [German-language plastics-processing industry journal])

FIG. 7 illustrates the basic physical relationship by means of which, according to the invention, the influence of the temperature control branches K1 to K4 on the heat budget of the molding tool 2 and thus on the quality of the molded parts to be produced can be determined.

Figure 8:
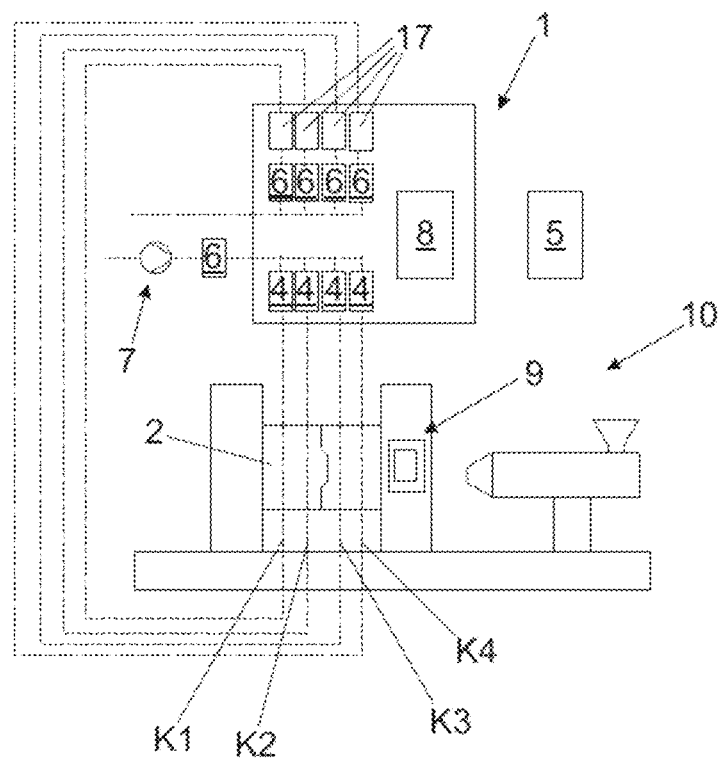
FIG. 8 is a schematic representation of the arrangement according to the invention together with a temperature control device according to the invention.

If temperature probes 11 in a molding tool 2 are arranged with certain spacings (see positions P1 to P3 in FIG. 8) relative to a mold cavity or a molding cavity 13, the temperature profiles T1 to T3 represented on the right in the diagram of FIG. 8 result.

Here, the position P3 is at the cavity wall, position P2 is situated in the molding tool 2 with a certain spacing relative thereto, and position P1 is situated with a somewhat greater spacing. The molding compound 12 which is introduced into the molding cavity/the mold cavity 13 gives rise, at position P3, to a steep temperature profile T3 with a characteristic shape (periodic oscillation). Comparison with the temperature profiles T2 and T1 shows that the steep and characteristic shape quickly decreases in amplitude, and the characteristic shape changes significantly due to the heat propagation, which is more inert compared with the forming cycle. A central aspect of the invention is the knowledge that, through systematic analysis, it can nevertheless be reproducibly identified which temperature control branches K1 to K4 play what role in the heat budget of the molding tool 2. The closer to the cavity surface a circuit is situated, the more pronounced the characterizing features under consideration are.

In other words, a temperature control branch with the spacing P1 would already have significantly less influence on the molded part than a temperature control branch with the spacing P2 owing to the greater distance. As a result, the volume flow could be reduced, in particular the temperature difference could be increased, there.

One advantage of the invention is that no temperature probes need to be installed in the tool in order to identify whether a temperature control branch is positioned close to the cavity, but rather the temperature profile in the temperature control medium can be used for the categorization. Any tools can thus be categorized, irrespective of sensor arrangements installed therein.

In summary, the following physical effects in particular play a significant role in the heat budget of the molding tool 2:
- cyclic oscillation of the heat flow (or of the surface temperature) at the cavity surface due to the forming process (injection molding process),
- propagation of the thermal wave in the tool steel,
- the amplitude of thermal waves increases due to an increase of the introduced heat flow per unit area or reduction of the frequency (both are approximately constant in the case of injection molding, for example),
- decaying amplitude of the heat flow with increasing distance, damping by tool steel,
- resultant great heat flow at temperature control branches K1 to K4 in locations in which a great heat flow is introduced,
- the heat flow requires time to propagate in the molding tool 2,
- the heat flow is therefore measurable earlier on the temperature control branches K1 to K4 that are situated close to the mold cavities 13,
- the cycle frequency (or cycle time) is therefore identifiable on the heat flow in the temperature control branch K1 to K4, and
- furthermore, this frequency or the increase of the heat flow is identifiable earlier if the temperature control branch K1 to K4 is situated close to the mold cavity 13.

In the case of constant volume flow, the temperature difference in the temperature control branch can be used instead of the heat flow. In the case of an additionally constant inflow temperature, the outlet temperature of the temperature control branch can be used.

The invention can also be used in the case of hot runner systems (see FIG. 9). Hot runner systems generally have a separate closed-loop temperature/power control. The controlled variable is normally the temperature of a hot runner zone. However, the hot runner can be only heated (manipulated variable for heating power). For the closed-loop control and heat dissipation, the cooling by the medium in the adjacent temperature control branches is necessary. Without adequate cooling, the zone can overheat. Since the hot runner system has a separate closed-loop control, a stable temperature takes effect if adequate cooling is present.

It would be conceivable to use the information regarding a sufficiently present temperature control medium volume flow in the temperature control branches ascertained by the invention as having relevance for the hot runner in order to enable/initiate the activation or lowering/deactivation of the hot runner zone.

A simple example: if the temperature control branch is relevant for the hot runner zone and too little water is flowing (for example because it has been forgotten to activate the temperature control branch or there is a blockage in the temperature control branch), the activation of the hot runner zone (or of the entire hot runner system) can be prevented, or a deactivation or at least a lowering to a non-critical temperature can be initiated. Of course, this can be effected on the basis of the relationship found between hot runner and temperature control branches.

If the manipulated variable of the hot runner is at the lower limit and the setpoint temperature still cannot be reached (the hot runner is at risk of overheating), the volume flow in the temperature control branch in question can be increased in order to dissipate a higher heat flow and make the closed-loop control possible. If the manipulated variable of the hot runner is at the upper limit (thus does not reach the desired temperature), the volume flow can be reduced in order that less heat is dissipated and heating is made possible.

FIG. 8 shows an arrangement according to the invention of a forming machine 10 (here, by way of example, an injection molding machine) with a temperature control device 1 according to the invention.

The molding tool 2 is clamped in the forming machine 10. Temperature control branches K1 to K4, which in this embodiment are connected in parallel in terms of flow, lead through the molding tool 2.

It is to be noted that only those line portions which are present within the molding tool 2, and which thereby actively participate in the heat budget of the molding tool 2, are to be understood as temperature control branches K1 to K4 in the true sense (the arrangement of the reference number is for the sake of the clarity of the representation).

Of course, other hose and line portions (inlet/inflow on the one hand and outlet/return on the other hand) which lead from and to the temperature control device 1 are still present in almost all cases, but in practice do not impair the method according to the invention.

The temperature control device 1 according to the invention firstly includes a conveying device 7 for generating the volume flow which is conveyed through the temperature control branches K1 to K4.

After this, in this embodiment, a temperature sensor 6 is provided for measuring the temperature profile of the supplied medium. Particularly if, as here, the temperature control branches K1 to K4 are fed from a common inlet and the inlet temperature is fairly constant, however, this temperature sensor 6 need not necessarily be present in the inflow.

The conveying device 7 can also be situated with a spacing relative to the temperature control device.

This is followed by actuators 4 (here electrically or electronically actuatable throttles with adjustable degree of throttling) for influencing the volume flows through the individual temperature control branches K1 to K4. These could furthermore also be installed in the temperature control branches K1 to K4 after the molding tool 2 in terms of flow.

After the temperature control media flows have passed through the molding tool 2, they are returned to the temperature control device 1 again. At this point, volume flow sensors 17 and further temperature sensors 6 are provided individually for the temperature control media flows, by means of which the volume flows through the temperature control branches K1 to K4 and the branch temperature profiles RLT01 to RLT04 can be measured. For the use in the method according to the invention, it can be provided that the measured values recorded by the temperature sensor 6 arranged in the inflow are subtracted from the measured values from the other temperature sensors 6, and the branch temperature profiles RLT01 to RLT04 are used in this form as temperature difference in order to eliminate possible temperature fluctuations in the inflow. As mentioned, this is not necessary in all cases.

In principle, the measured values from the volume flow sensors 17 can also be taken into consideration in the categorization according to the invention of the temperature control branches K1 to K4.

The processing unit 5 is connected, for transmission of signals, to the temperature sensors 6 for measuring the branch temperature profiles RLT01 to RLT04, preferably also to the central machine controller 9, for example in order to receive information regarding the cycle time and the start of production and/or of the feed of the molding compound 12 to the at least one portion 3 of the molding tool 2.

The processing unit 5 is formed to perform the above-described method according to the invention. In particular, in this embodiment, it is provided that the processing unit 5 automatically specifies setpoint temperature differences individually for the individual temperature control branches K1 to K4 on the basis of the method according to the invention.

Furthermore, the temperature control device 1 in this embodiment has an open-loop or closed-loop control unit 8, which is likewise connected, for transmission of signals, to the temperature sensors 6, the volume flow sensors 17 and the actuators 4 in order to perform an open-loop or closed-loop control, known per se, according to the temperature difference of the individual temperature control branches K1 to K4.

Furthermore, in this embodiment, it is provided that, on the basis of the closed-loop temperature difference control, the open-loop or closed-loop control unit 8 performs a subordinate open-loop or closed-loop control of the volume flows through the temperature control branches K1 to K4, for which purpose the actuators 4 are actuated correspondingly.

The open-loop or closed-loop control unit 8 can be connected, for transmission of signals, to the processing unit 5 (and/or to the central machine controller), for example in order to obtain the setpoint values specified according to the invention or to receive a signal that the actuators 4 are made equal, in particular fully opened, for the performance of the method according to the invention, and/or the open-loop or closed-loop control is to be suspended for the duration of the method according to the invention.

Connections for transmission of signals are not represented in FIG. 8 in order to preserve the clarity of the representation.

The processing unit 5 can be formed integral with the central machine controller 9 of the forming machine 10 and/or the open-loop or closed-loop control unit 8 of the temperature control device 1.

FIG. 9 schematically shows the structure of a molding tool 2 (injection molding tool) with a hot runner system 14.

During normal operation, a plasticized plastic as molding compound 12 is, during the injection operation, conveyed through the hot runner system, onward through the hot runner nozzles 15, and finally into the mold cavity 13.

Through the method according to the invention, the temperature control branches K1 to K4 (only one of the temperature control branches is provided with a reference number in FIG. 9) that have a stronger thermal coupling to the hot runner system 14 can be identified.

For this purpose, some of the hot runner nozzles 15 are closed, and thus only the portion 3 of the molding tool 2 that is situated in the vicinity of the open hot runner nozzles 15 is filled with molding compound 12. Through analysis of the increase behavior of the branch temperature profiles, it will emerge that the temperature control branches K1 to K4 that are situated to the right of the mold cavity 13 in FIG. 10 have a greater influence on the heat budget of the portion 3 (thus of the surroundings of the hot runner system 14) of the molding tool 2 than those which are situated to the left of the mold cavity 13 in FIG. 10. With the invention, it can thus be identified which of the plurality of temperature control branches K1 to K4 are situated close to the hot runner system 14, and which are not.

This could even be used to identify series and/or parallel connections in hot runner systems 14.

A stepwise activation of heating zones of the hot runner system 14 can furthermore also make a precise assignment possible in this regard.

As already mentioned, as a portion 3 of a molding tool 2 with several molding cavities 13, it would also be possible to examine only a single molding cavity 13, or a group of molding cavities 13.

Similarly, with the method according to the invention, it can be identified which temperature control branches K1 to K4 are arranged in the vicinity of an injection apparatus and/or of an injection nozzle of an injection molding machine.

Finally, the method according to the invention could also be used in the construction of a virtual thermal tool model by performing analyses of an oscillation behavior and/or of an increase or decrease behavior in simulations. The following objects would then be present as virtual objects: the temperature control device 1 and/or the molding tool 2 and/or the actuators 4 and/or the temperature sensors 6 and/or the conveying device 7 and/or the forming machine 10 and/or the temperature probes 11 and/or the molding compound 12 and/or the mold cavity/the molding cavity 13 and/or the hot runner system 14 and/or the hot runner nozzle 15 and/or the ejector 16 and/or the temperature control branches K1-K4.

The measured characteristic variables of the temperature control branches of the real tool can also be compared with these calculated characteristic variables of the temperature control branches of a tool model from an injection molding simulation.

The characteristic thermal behavior of the individual temperature control branches can be compared with the results of the simulation in order to generate an assignment between the circuits of the temperature control device (real structure on the machine) and the circuits of the simulation model. With reference to this assignment, setpoint values present in the simulation or in a dataset (for example volume flow or temperature difference) can for example be set correctly for the corresponding temperature control branches or the correct hose system of the circuits can be checked.

LIST OF REFERENCE NUMBERS

Temperature control device 1
Molding tool 2
At least one portion 3 (of the molding tool)
Actuators 4
Processing unit 5
Temperature sensors 6
Conveying device 7
Open-loop or closed-loop control unit 8
Central machine controller 9
Forming machine 10
Temperature probe 11 (in the molding tool)
Molding compound 12
Mold cavity/molding cavity 13
Hot runner system 14
Hot runner nozzle 15
Ejector 16
Volume flow sensors 17
Temperature control branches K1-K4
Branch temperature profiles RLT01-RLT04
Positions P1-P3
Temperature profiles T1-T3

The invention claimed is:

1. A method for classifying temperature control branch of a molding tool according to an influence on a heat budget of a portion of the molding tool, the method comprising:
producing, by proceeding in production cycles, molded parts by using the portion of the molding tool, with introduction of heat into the molding tool, and/or cyclically activating a heating device, with introduction of heat into the molding tool,
conveying a temperature control medium through the temperature control branch of the molding tool to dissipate at least some of the introduced heat,
measuring a temporal branch temperature profile of the temperature control medium in the temperature control branch over several production cycles,
analyzing a curve behavior of the branch temperature profile and/or of a variable derived from the branch temperature profile over several production cycles, and
sorting the temperature control branch into one of at least two categories, according to greater and/or smaller influence on the heat budget of the portion of the molding tool, on the basis of the curve behavior.

2. The method according to claim 1, wherein the analyzing of the curve behavior includes or is an analysis of oscillation behavior.

3. The method according to claim 2, wherein, for the dissipation of at least some of the introduced heat, a temperature control medium is conveyed through temperature control branches of the molding tool, temporal branch temperature profiles of the temperature control medium in the temperature control branches are measured over several production cycles, the branch temperature profiles are subject to different fluctuations due to different degrees and/or rates of heat transfer of the heat introduced into the molding tool to the respective temperature control branch, differences occurring in the oscillation behavior between the branch temperature profiles and/or the variable, derived from the branch temperature profile, of the temperature control branches are identified, and the temperature control branches are sorted into in each case one of the at least two categories, according to greater and/or smaller influence on the heat budget of the portion of the molding tool, on the basis of the differences in the oscillation behavior.

4. The method according to claim 2, wherein, within a framework of the analyzing of the oscillation behavior, an amplitude, a frequency and/or a period of the branch temperature profile and/or of the variable derived therefrom is determined, and is optionally used for the identification of the differences in the oscillation behavior.

5. The method according to claim 1, wherein the analyzing of the curve behavior includes or is an analysis of an increase or decrease behavior.

6. The method according to claim 5, wherein, for the dissipation of at least some of the introduced heat, a temperature control medium is conveyed through temperature control branches of the molding tool, temporal branch temperature profiles of the temperature control medium in the temperature control branches are measured, the branch temperature profiles are subject to different fluctuations due to different degrees and/or rates of heat transfer of the heat introduced into the molding tool to the respective temperature control branch, differences occurring in the increase or decrease behavior between the branch temperature profiles and/or the variable, derived from the branch temperature profile, of the temperature control branches are identified, and the temperature control branches are sorted into in each case one of the at least two categories, according to greater and/or smaller influence on the heat budget of the portion of the molding tool, on the basis of the differences in the increase or decrease behavior.

7. The method according to claim 5, wherein, within a framework of the analyzing of the increase behavior, a time of a first increase of the branch temperature profile lying above a threshold value is determined.

8. The method according to claim 1, wherein a setpoint value for an open-loop or closed-loop control of temperature control media flow conveyed through the temperature control branch is set based on a category of the temperature control branch.

9. The method according to claim 8, wherein a setpoint temperature difference between an inlet temperature and an outlet temperature of the temperature control branch is used as a setpoint value.

10. The method according to claim 8, wherein a setpoint volume flow is used as a setpoint value.

11. The method according to claim 1, wherein actuators for open-loop-controlled or closed-loop-controlled influencing of temperature control media flow conveyed through the temperature control branch are made equal at a start of the method.

12. The method according to claim 1, wherein temperature control branches are used, and actuators for open-loop-controlled or closed-loop-controlled influencing of temperature control media flows conveyed through the temperature control branches are adjusted at a start of the method such that the temperature control media flows through the temperature control branches are made equal.

13. The method according to claim 1, wherein the branch temperature profile is a temporal profile of a temperature difference between an inlet temperature and an outlet temperature of the temperature control branch.

14. The method according to claim 1, wherein the temperature control branch is sorted into one of at least three categories, the at least three categories include a first category of great influence on the heat budget of the portion of the molding tool, a second category of medium influence on the heat budget of the portion of the molding tool, and a third category of small influence on the heat budget of the portion of the molding tool.

15. The method according to claim 1, wherein at least one of the producing, the conveying, the measuring, the analyzing, and the sorting is performed automatically by a processing unit.

16. The method according to claim 1, wherein the analyzing of the curve behavior is carried out on a branch heat flow over several production cycles.

17. The method according to claim 7, wherein the time of the first increase of the branch temperature profile lying above the threshold value is used for identification of the differences in the increase behavior.

18. The method according to claim 9, wherein setpoint temperature differences for temperature control branches with greater influence on a heat budget of the portion of the molding tool are set smaller in magnitude than setpoint temperature differences for temperature control branches with smaller influence on the heat budget of the portion of the molding tool.

19. The method according to claim 10, wherein setpoint volume flows for temperature control branches with greater influence on the heat budget of the portion of the molding tool are larger relative to a maximum achievable volume flow, than in a case of temperature control branches with smaller influence on the heat budget of the portion of the molding tool.

\* \* \* \* \*